Jan. 2, 1923.
T. S. WATSON.
RUNNING GEAR.
FILED APR. 17, 1922.
1,441,190.
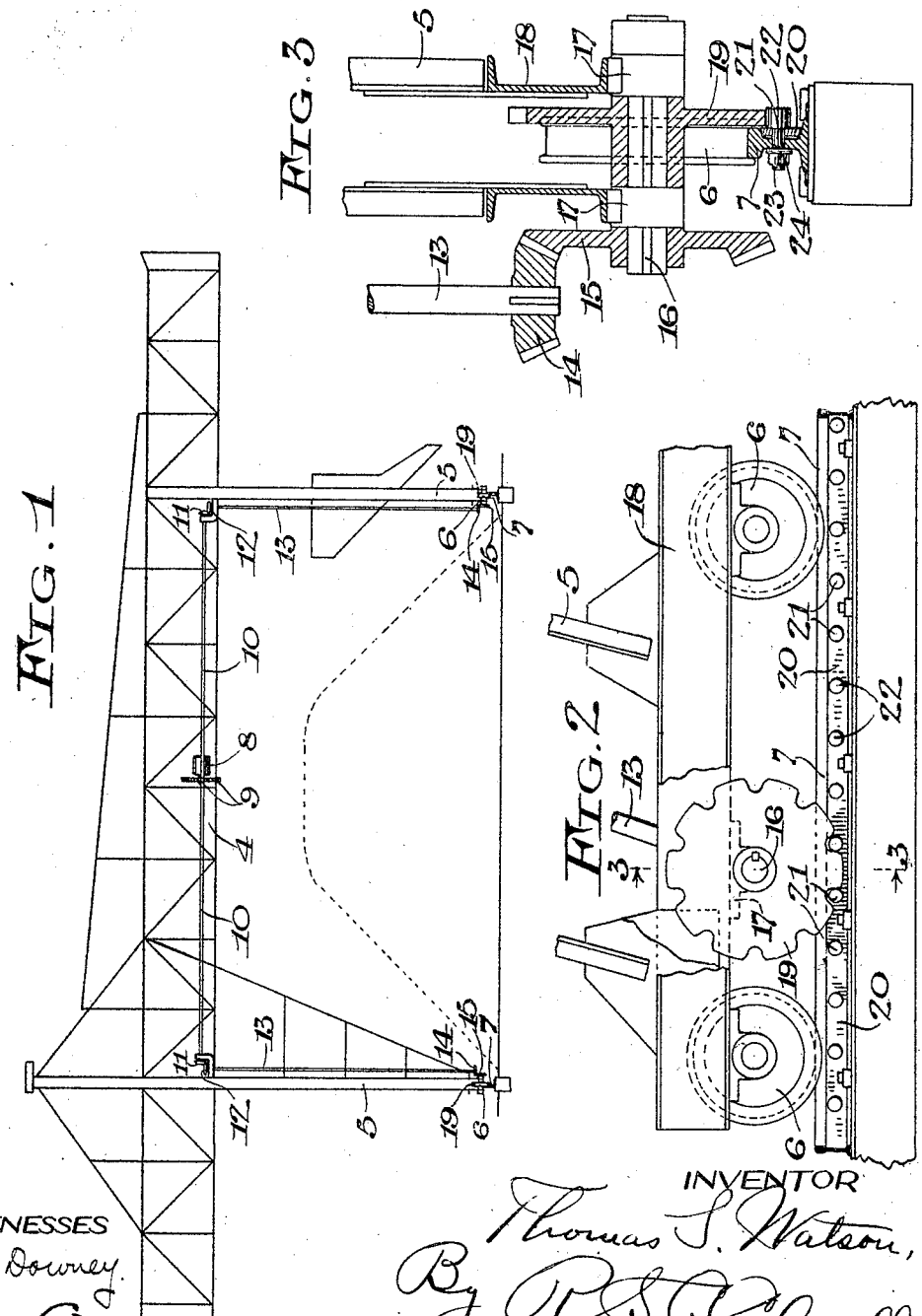
INVENTOR
Thomas S. Watson,
By R. S. Caldwell
ATTORNEY
WITNESSES
M. E. Downey
C. L. Naal Patented Jan. 2, 1923.

1,441,190

UNITED STATES PATENT OFFICE.

THOMAS S. WATSON, OF MILWAUKEE, WISCONSIN.

RUNNING GEAR.

Application filed April 17, 1922. Serial No. 554,210.

*To all whom it may concern:*

Be it known that I, THOMAS S. WATSON, a citizen of the United States, and resident of Milwaukee, in the county of Milwaukee and State of Wisconsin, have invented new and useful Improvements in Running Gears, of which the following is a description, reference being had to the accompanying drawings, which are a part of this specification.

The invention relates to conveying structures, and more particularly to the running gear for positively driving the propelling structure along the supporting rails by means of a propelling gear and rack.

The principal object of the invention is to provide a simple and compact combination of supporting rail and pin rack in which the pins forming the rack are carried by the supporting rail and are so constructed as to reduce to a minimum the liability of clogging the rack, and to permit the ready removal of snow, ice, dirt or other foreign matter from the vicinity of the rack.

With the above and other objects in view the invention consists in the construction and the several features thereof hereinafter described and all equivalents.

In the drawings: Fig. 1 is a side elevation view of a conveying structure provided with running gear embodying the invention; Fig. 2 is a detail side view of one of the propelling trucks, parts being broken away; Fig. 3 is a section taken on the line 3—3 of Fig. 2.

Referring to the drawings, the illustrated conveying structure comprises a conveying-bridge 4, the trucks 5 of which are mounted on supporting and guide wheels 6 running on rails 7. A motor 8, such as an electric motor, is mounted on the bridge and through gearing 9 drives a line shaft 10 which carries bevel gears 11 meshing with similar gears 12 on transmission shafts 13, each shaft 13 carrying a gear 14 which meshes with a gear 15 mounted on a shaft 16 journalled in bearings 17 on the truck frame members 18.

The running gear includes the wheels 6, supporting rails 7, propelling wheels 19 mounted on the shafts 16 and pin racks engaged by said propelling wheels and associated with the rails 7.

In the present invention the supporting rail is combined with the pin rack. In its preferred form the supporting rail is of usual construction and is laid along the roadbed in sections in the usual manner and these sections may be connected at their joints by the usual fish plates. In the present instance, however, the rail sections are preferably coupled together on at least one side by plates 20 extending along the rails and positioned to overlap the rail joints. These plates 20 are disposed in upright position between the head and base of the rail and are preferably secured to the rail by the elements forming the pin rack.

The elements forming the pin rack are preferably in the form of bolts or pins 21 having round heads 22 and having their threaded shanks passing through alined openings in the plates 20 and the web of the rail. These bolts 21 are clamped in position with their heads abutting against the exposed sides of the plates 20 by nuts 23 abutting against washers 24. These bolts also serve to clamp the plates 20 to the rails. The plates 20 in addition to forming tie plates between the sections of the supporting rail 7 also form a straight side for the supporting rail from which the rack pins project and as the heads of such pins are not confined and are elevated above the roadbed and spaced from each other, the liability of clogging the rack is reduced to a minimum. Furthermore, since the rack is fully exposed any foreign matter tending to collect in the region of the rack may be readily removed. With this construction the rail and rack are made continuous, that is, the rail with its pin rack extends the length of the area over which the conveying structure operates. The weight of the conveying structure is taken by the supporting and guide rails 7 so that the rack pins, successively engaged by the propelling wheels 19 of each truck to positively propel the structure along its track, are relieved of any strain occasioned by this weight.

I desire it to be understood that this invention is not to be limited to any specific form or arrangement of parts except in so far as such limitations are specified in the claims.

What I claim as my invention is:

1. Running-gear for conveying structures comprising a truck, a rail, supporting and guide wheels for said truck and running on said rail, spaced pins carried by the rail and projecting therefrom to form a pin rack, and a propelling wheel on the truck engageable with said rack.

2. Running-gear for conveying structures comprising a truck, a rail, supporting and guide wheels for said truck and running on said rail, and horizontally disposed spaced pins passing through and clamped to the rail and projecting therefrom to form a pin rack, and a propelling wheel on the truck engageable with said rack.

3. Running-gear for conveying structures comprising a truck, a rail, supporting and guide wheels for said truck and running on said rail, plates disposed alongside of said rail, transversely disposed spaced pins passing through said plates and rail and joining the plates to the rail and having headed projections forming a pin rack, and a propelling wheel on the truck engageable with said rack.

4. Running-gear for conveying structures comprising a truck, a rail, supporting and guide wheels for said truck and running on said rail, spaced pins having heads projecting from the rail to form a pin rack, threaded shanks passing through the rail, nuts on said shanks clamping said pins in position, and a propelling wheel on the truck engageable with said rack.

5. Running-gear for conveying structures comprising a truck, a sectional rail, supporting and guide wheels for said truck and running on said rail, plates joining the sections of the rail together and disposed against one side of the rail, transversely disposed spaced pins passing through said plates and rail and joining the plates to the rail, said pins having headed projections forming a pin rack, and a propelling wheel on the truck engageable with said rack.

6. Running-gear for conveying structures comprising a truck, a sectional rail, supporting and guide wheels for said truck and running on said rail, means for joining the sections of the rail together including plates, spaced pins having heads projecting from said plates to form a pin rack, and a propelling wheel on the truck engageable with said rack.

In testimony whereof, I affix my signature.

THOMAS S. WATSON.